(12) United States Patent
Peter et al.

(10) Patent No.: US 7,267,629 B2
(45) Date of Patent: Sep. 11, 2007

(54) DIFFERENTIAL GEAR

(75) Inventors: Robert Peter, Rossbach (DE);
Manfred Geier, Ruderting (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 180 days.

(21) Appl. No.: 11/080,222

(22) Filed: Mar. 15, 2005

(65) Prior Publication Data
US 2005/0215378 A1 Sep. 29, 2005

(30) Foreign Application Priority Data
Mar. 29, 2004 (DE) .................. 10 2004 015 316

(51) Int. Cl.
*F16H 48/06* (2006.01)
(52) U.S. Cl. ..................................... 475/230
(58) Field of Classification Search ............... 475/159, 475/160, 230, 231
See application file for complete search history.

(56) References Cited
U.S. PATENT DOCUMENTS 3,326,064 A * 6/1967 Ordorica, Jr. ............... 475/235
4,978,329 A    12/1990 Yasui et al.
5,624,343 A *  4/1997 Krisher ....................... 475/160
5,938,558 A *  8/1999 Eybergen et al. ........... 475/231
5,951,431 A    9/1999 Downs et al.
6,010,424 A    1/2000 Irwin
6,168,545 B1 * 1/2001 Lowell ....................... 475/231
6,488,606 B1 * 12/2002 Young et al. ............... 475/231
6,743,136 B1 * 6/2004 Jensen ........................ 475/160

FOREIGN PATENT DOCUMENTS

| DE | 1 289 706 | 2/1969 |
| DE | 2 038 137 | 2/1972 |
| DE | 38 41 234 C2 | 3/1993 |
| DE | 198 20 206 A1 | 11/1998 |
| DE | 101 41 995 A1 | 4/2003 |

* cited by examiner

*Primary Examiner*—Ha D. Ho
(74) *Attorney, Agent, or Firm*—Davis Bujold & Daniels, P.L.L.C.

(57) ABSTRACT

A lockable differential gear having an integral differential gear housing (1). The differential gear housing (1) has a plurality of apertures (8) located opposite one another. A number of the internal parts of the differential gear are mounted, during installation, within the differential gear housing (1) by passing through one of the plurality of apertures (8) during the assembly process. The plurality of apertures (8) generally remain open following the assembly process.

18 Claims, 2 Drawing Sheets

DIFFERENTIAL GEAR

This application claims priority from German Application Ser. No. 10 2004 015 316.7 filed Mar. 29, 2004.

FIELD OF THE INVENTION

The invention relates to differential gears.

BACKGROUND OF THE INVENTION

When using common differential gears, so-called self-locking differentials, are used in order to prevent the one-sided spinning of drive gears.

German laid-open application DE-2 038 137 discloses a self-locking differential gear in which one bolt is supported in one first part of a differential gear housing and is axially secured with a pin and the differential bevel gears are rotatably supported upon the bolt. The differential bevel gears are in operative connection with the axle bevel gears which are connected via brakes with the differential gear housing. The differential gear housing comprises two parts; one main part and one cover, which is screwed with the main part. This is necessary to make mounting the parts in the differential gear housing possible through the large circular axial aperture and carrying out treatments of the differential gear housing. By screwing the first differential housing part with the second differential housing part, the differential gear becomes more expensive and the total weight and needed diameter of the differential gear are increased.

DE 38 41 234 C2 likewise discloses a lockable differential gear having first and second differential gear housing parts interconnected via screw threads. Since the screw threads are situated radially outside the brake, the differential gear radially needs more installation space.

The problem on which this invention is based is to provide a lockable differential gear which stands out by small radial dimensions of the differential gear housing thus being more economical and lighter.

The problem is solved by a differential gear according to the invention.

SUMMARY OF THE INVENTION

The differential gear has one integral housing, according to the invention, the wall of which has at least one aperture through which the axle bevel gears, differential gears and the brakes can be mounted. Through the aperture, lubricant reaches into the differential gear additionally cooling the brake. The edges of the aperture are preferably provided with a radius designed so that stresses be reduced in the differential gear housing during operation of the differential gear.

In another embodiment, the differential gear housing has great wall thickness in the area of the edge of the aperture.

In one other development of the invention two apertures which are opposite to each other are situated in the differential gear housing. The differential gear housing has one bolt on which are supported two differential bevel gears and which supports itself in holes of the differential gear housing. The bolt is held in the differential gear housing via one pin. The differential gear housing has a wall area of great thickness in the area where the bolt is held in the differential gear housing. The great thickness of the edge of the aperture and the great thickness in the area of the hole for the bolt are designed so that a fitting is possible along the axis of rotation of the differential gear. By the differential gear housing being designed in one piece, it needs considerably less radial installation space which also makes itself noticeable by less weight and lower cost. The axle bevel gears have a toothing upon which are held internal discs of the multi-disc brake, the external discs of the multi-disc brake being connected with the differential gear housing via a toothing or semicircular shackles. The toothing drifting force on the axle bevel gears is used for applying a locking torque via the multi-disc brake. In one other development of the invention a spring element can additionally act upon the multi-disc brake and produce a basic locking torque.

BRIEF DESCRIPTION OF THE DRAWINGS

The invention will now be described, by way of example, with reference to the accomnanying drawings in which.

DETAILED DESCRIPTION OF THE INVENTION

Figure 1:
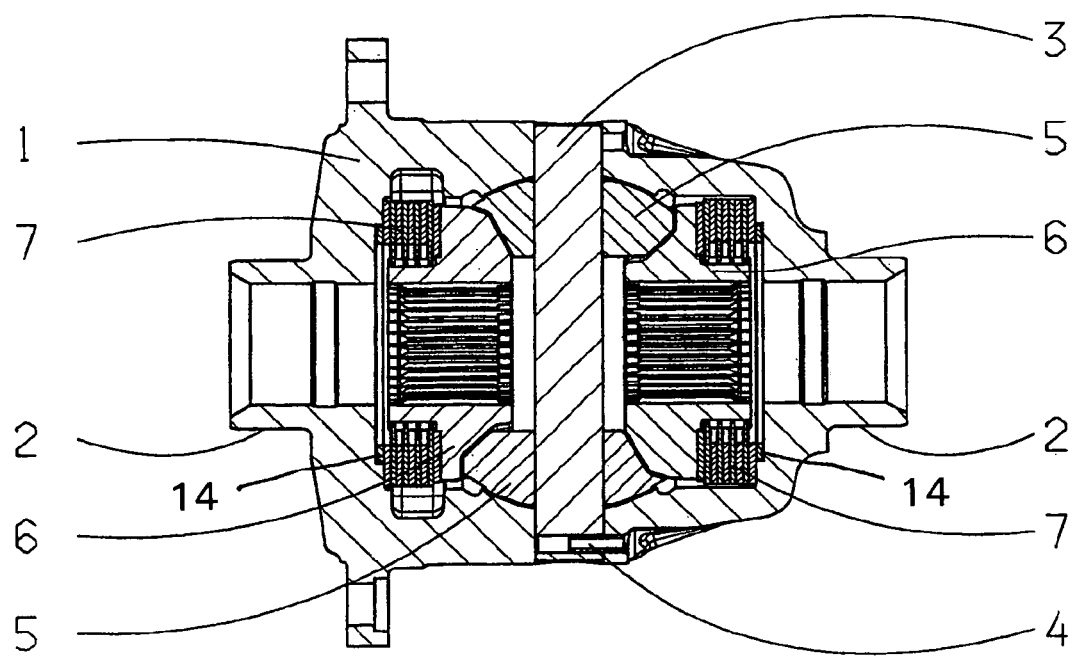
FIG. 1 is a section through the axis of rotation and through the bolt of the differential gear.
Figure 2:
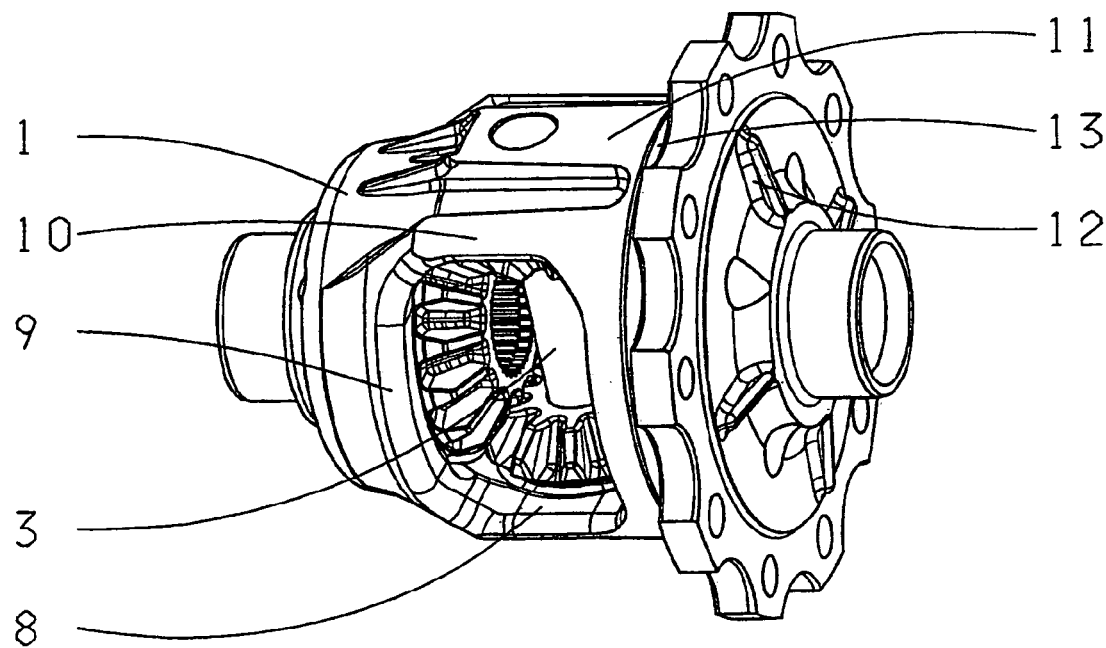
FIG. 2 is a spatial graph of the differential gear.
Figure 3:
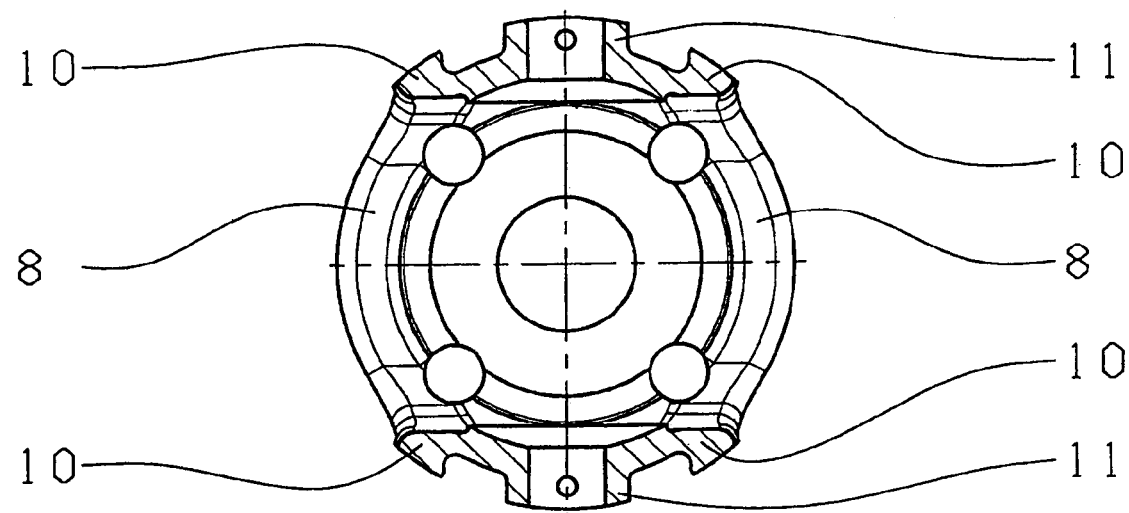
FIG. 3 is a section through the central axis of the bolt forming a right angle with the axis of rotation of the differential gear.
Figure 4:
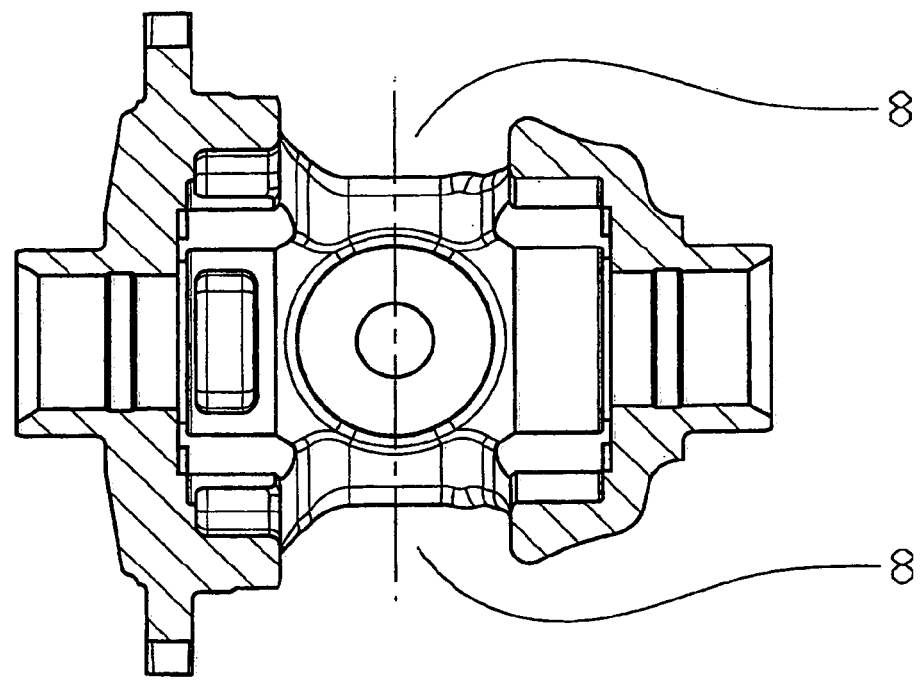
FIG. 4 is a section through the axis of rotation of the differential gear forming a right angle with the central axis of the bolt.

FIG. 1:

A differential gear housing 1 is designed in one piece and has on each of its axial ends cylindrical extensions 2 by way of which the differential gear is rotatably supported around its axis of rotation. One bolt 3 is held in the differential gear housing 1 via one pin 4. Differential bevel gears 5 are rotatably supported upon the bolt 3. Axle bevel gears 6 are connected via engaging gears with the discs of one brake 7, the outer discs of the brake 7 supporting themselves in the differential gear housing 1. One spring element 14 additionally acts upon the multi-disc brake thereby producing a basic locking torque. The spring element 14 can be designed here as a plate spring or also as a corrugated spring, the spring element being located in one recess or groove of the differential gear housing 1 so that the prestress of the spring element 14 is adjusted via the depth of the recess or of the groove and the spring element 14 is in the linear area of its characteristic line whereby the adjustment of the basic locking torque is simplified.

FIG. 2:

The differential gear housing 1 has apertures 8 opposite to each other through which the differential bevel gears 5 and the axle bevel gears 6, the same as the brakes, can be mounted in the differential gear housing 1. The aperture 8 is dimensioned so that even if the parts can be mounted in the differential gear housing 1, the necessary torque still is not transmissible. For the purpose, the edge area of the aperture 8 is provided with a radius 9 whereby the stresses are reduced. In addition, the wall 10 of the differential gear housing 1 is made thicker in the area of the edge of the aperture 8. The wall 11 is, likewise, made thicker in the area in which the bolt 3 is held in the differential gear housing 1. In the axial area, where the differential gear 1 can be fastened with a crown gear, ribs 12 are disposed in order to increase the stability without this negatively affecting the weight. Since the differential gear housing 1 is designed in one piece, it is possible to reduce the inner radius of a crown gear since a stop 13, likewise, has a small radius.

FIG. 3:

For reasons of clarity the housing is shown exclusively in section and the inner parts removed. The two apertures 8 opposite to each other, have reinforced walls 10 in their edge area. In the area of fastening of the bolt 3 in the differential gear housing 1, the wall 11 is likewise made reinforced.

FIG. 4:

The apertures 8 of the differential gear housing 1 make is possible to mount the inner parts and conduct the needed treatments.

| Reference numerals | |
|---|---|
| 1 | differential gear housing |
| 2 | cylindrical extensions |
| 3 | bolt |
| 4 | pin |
| 5 | differential bevel gears |
| 6 | axle bevel gears |
| 7 | brake |
| 8 | aperture |
| 9 | radius |
| 10 | wall |
| 11 | wall |
| 12 | ribs |
| 13 | stop |
| 14 | spring element |

The invention claimed is:

1. A differential gear comprising a differential gear housing (1) where axle bevel gears (6) are in operative connection with differential bevel gears (5), the axle bevel gears (6) being rotatably supported about an axis of rotation defined by two cylindrical extensions (2) of the differential gear housing (1), at least one of the axle bevel gears (6) is connectable with the differential gear housing (1) via a brake (7), the differential bevel gears (5) are supported in the differential gear housing (1) via at least one bolt (3), and the differential gear housing (1) generally having a first housing thickness;

wherein the differential gear housing (1) is a one piece housing and has at least one aperture (8), located between the two cylindrical extensions (2), through which the differential bevel gears (5), the axle bevel gears (6) and the brake pass for mounting within the differential gear housing (1) and by way of which lubricant reaches the brake;

the at least one aperture (8) being of a size sufficient to allow passage therethrough of at least the differential bevel gears (5), the axle bevel gears (6) and the brake (7) into an interior space of the differential gear housing (1) for mounting therein; and a perimeter edge of the at least one aperture (8) has a reinforced thickened wall which is thicker than the first housing thickness and an area of the differential gear housing (1), which supports the at least one bolt (3), has a reinforced thickened wall for supporting the at least one bolt (3) which is also thicker than the first housing thickness.

2. The differential gear according to claim 1, wherein the brake (7) is a multi-disc brake.

3. The differential gear according to claim 1, wherein the brake (7) is prestressed, via a spring element (14), so that a locking torque is applied between at least one of the axle bevel gears (6) and the differential gear housing (1).

4. The differential gear according to claim 3, wherein the spring element (14) is one of a plate spring and a corrugated spring.

5. The differential gear according to claim 3, wherein the spring element (14) is located in one of a recess and a groove of the differential gear housing (1).

6. The differential gear according to claim 5, wherein the prestressing of the brake (7), via the spring element (14), is adjustable via one of a depth of one of the recess and the groove of the differential gear housing (1).

7. The differential gear according to claim 5, wherein the spring element (14), during prestressing, is disposed so that the spring element (14), during operation of the differential gear, is in a linear area of a spring characteristic line.

8. The differential gear according to claim 1, wherein each one of the axle bevel gears (6) cooperates with a brake (7).

9. The differential gear according to claim 1, wherein two differential bevel gears (5) are supported in the differential gear housing (1) via the at least one bolt (3).

10. The differential gear according to claim 1, wherein two apertures (8) are situated in the differential gear housing (1) at locations substantially opposite from one another and each one of the two apertures (8) has a perimeter edge which has a reinforced thickened wall which is thicker than the first housing thickness.

11. The differential gear according to claim 1, wherein perimeter edges of the at least one aperture (8) have a radius (9) which reduces stresses of the differential gear housing (1).

12. A differential gear comprising a differential gear housing (1) where axle bevel gears (6) are in operative connection with differential bevel gears (5), the axle bevel gears (6) being rotatably supported about an axis of a rotation defined by two cylindrical extensions (2) of the differential gear housing (1), at least one of the axle bevel gears (6) is connectable with the differential gear housing (1) via a brake (7); the differential bevel gears (5) are supported in the differential gear housing (1) via at least one bolt (3), and the differential gear housing (1) generally having a first housing thickness;

wherein the differential gear housing (1) is unitary single piece housing supporting the differential bevel gears (5) and having at least one aperture (8) located between the two cylindrical extensions (2);

the at least one aperture (8) being of a size sufficient to allow passage therethrough of each of the differential bevel gears (5), the axle bevel gears (6) and the brake (7) to facilitate mounting within the differential gear housing (1) and to facilitate passage of a lubricant for the brake; and at least an outer portion of a wall (10) of the differential gear housing (1), supporting the differential bevel gears (5), and a perimeter edge of the at least one aperture (8) each have a reinforced thickened wall which is thicker than the first housing thickness of the differential gear housing (1).

13. A differential gear having a differential gear housing (1) within which a pair of axle bevel gears (6) operatively communicate with a pair of differential bevel gears (5), the differential gear comprising:

a pair of opposed cylindrical extensions (2) which extend in opposite directions along an axis of rotation of the pair of axle bevel gears (6) and provide rotational support to the pair of axle bevel gears (6);

at least one brake (7) located within the differential gear housing (1) for providing a locking torque between the differential gear housing (1) and one of the pair of axle bevel gears (6); and at least one aperture (8) in the differential gear housing (1) providing access to an interior space of the differential gear housing (1), the at least one aperture (8) in the differential gear housing (1) being sufficiently large to allow passage of at least the axle bevel gears (6), the differential bevel gears (5) and the at least one brake (7) into the interior space of the differential gear housing (1) for installation therein, and the differential gear housing (1) being formed as an integral structure with the at least one aperture (8) providing access to the interior space of the differential gear housing (1);

the pair of differential bevel gears (5) being supported in the differential gear housing (1) via at least one bolt (3);

a first portion of a wall (10) of the differential gear housing (1), in an area spaced from an area of a connection with the at least one bolt (3), has a first housing thickness;

a second outer portion of the wall (10) of the differential gear housing (1), which supports the at least bolt (3), has a second housing thickness which is greater than the first housing thickness; and a third portion of a wall (10) of the differential gear housing (1), that defines a perimeter periphery of the at least one aperture (8), has a third housing thickness which is also greater than the first housing thickness.

14. The differential gear according to claim 13, wherein the at least one brake (7) is a multi-disc brake.

15. The differential gear according to claim 13, wherein at least one spring element (14) provides a biasing force to the at least one brake (7) which provides the locking torque between the differential gear housing (1) and at least one of the pair of axle bevel gears (6).

16. The differential gear according to claim 15, wherein the at least one spring element (14) is one of a plate spring and a corrugated spring.

17. The differential gear according to claim 15, wherein the at least one spring element (14) is located in one of a recess and a groove of the differential gear housing (1).

18. The differential gear according to claim 17, wherein the biasing force of the at least one spring element (14) is adjustable by altering a depth of one of the recess and of the groove.

* * * * *